(12) United States Patent
Payton

(10) Patent No.: US 7,786,885 B2
(45) Date of Patent: Aug. 31, 2010

(54) EVENT LOCALIZATION WITHIN A DISTRIBUTED SENSOR ARRAY

(75) Inventor: David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1039 days.

(21) Appl. No.: 11/411,532

(22) Filed: Apr. 25, 2006

(65) Prior Publication Data

US 2007/0247303 A1 Oct. 25, 2007

(51) Int. Cl.
*G08B 21/00* (2006.01)

(52) U.S. Cl. .............. 340/686.6; 340/531; 340/539.13; 340/539.11; 455/456.1

(58) Field of Classification Search ............... 340/531, 340/539.11, 539.13, 686.6; 455/456.1; 342/357.08
See application file for complete search history.

(56) References Cited

U.S. PATENT DOCUMENTS

| | | | |
|---|---|---|---|
| 5,119,104 A | 6/1992 | Heller | |
| 5,734,335 A * | 3/1998 | Brogi et al. | 340/870.05 |
| 6,154,139 A | 11/2000 | Heller | |
| 6,195,020 B1 | 2/2001 | Brodeur, Sr. et al. | |
| 6,208,247 B1 * | 3/2001 | Agre et al. | 340/531 |
| 6,311,129 B1 | 10/2001 | Lin | |
| 7,005,980 B1 * | 2/2006 | Schmidt et al. | 340/539.13 |
| 7,318,010 B2 * | 1/2008 | Anderson | 340/531 |
| 7,429,936 B2 * | 9/2008 | Paradiso et al. | 340/539.13 |
| 7,558,583 B2 * | 7/2009 | Ledeczi et al. | 455/456.1 |
| 2005/0200480 A1 * | 9/2005 | Caras et al. | 340/539.22 |
| 2006/0176169 A1 * | 8/2006 | Doolin et al. | 340/531 |

* cited by examiner

*Primary Examiner*—Eric M Blount

(57) ABSTRACT

Described is a method for event localization within a distributed sensor array using a plurality of sensor nodes. The method includes an act of receiving a signal in at least one detecting node. The signal originates from an external disturbance and has a local signal such that the local signal reflects a relative proximity (i.e., between the detecting nodes) to the external disturbance. The method also includes acts of exchanging information regarding the signal between the detecting node and nearby nodes; and localizing the external disturbance based on its relative proximity. Through receiving a signal that reflects a relative proximity to the external disturbance and exchanging that information between nearby nodes, the sensor array localizes the external disturbance.

33 Claims, 13 Drawing Sheets

| Node A | Start | Signal received from Node E | Signal received from Node B | Signal re-received from Node B, after Node B received signal from Node H | Signal re-received from Node B, after Node B re-received a signal from Node H, which received a signal from Node J | Signal received from Node E, which received a signal from Node H, which received a signal from Node I, which received a signal from Node J |
|---|---|---|---|---|---|---|
| Hop Count To Max. Signal | 0 | 1 | 1 | 2 | 3 | 3 |
| Next Node Value | 0 | 0 | 0 | 0 | 0 | 0 |
| X-Flag | 1 | 1 | 1 | 1 | 1 | 1 |
| Local Signal | .40 | .40 | .40 | .40 | .40 | .40 |
| Max. Signal | .40 | .72 | .82 | .92 | .97 | .97 |

FIG. 9

| Node E | Start | Signal received from Node A | Signal received from Node G | Signal received from Node H | Signal re-received from Node H, after Node H received signal from Node J | Signal received from Node H, which received a signal from Node I, which received a signal from Node J. |
|---|---|---|---|---|---|---|
| Hop Count To Max. Signal | 0 | 0 | 0 | 1 | 2 | 2 |
| Next Node Value | 0 | .40 | .52 | .52 | .52 | .52 |
| X-Flag | 1 | 1 | 1 | 1 | 1 | 1 |
| Local Signal | .72 | .72 | .72 | .72 | .72 | .72 |
| Max. Signal | .72 | .72 | .72 | .92 | .97 | .97 |

FIG. 10

| Node H | Start | Signal received from Node G | Signal received from Node E | Signal received from Node B | Signal received from Node I | Signal received from Node J |
|---|---|---|---|---|---|---|
| Hop Count To Max. Signal | 0 | 0 | 0 | 0 | 0 | |
| Next Node Value | 0 | .52 | .72 | .82 | .85 | .85 |
| X-Flag | 1 | 1 | 1 | 1 | 1 | 1 |
| Local Signal | .92 | .92 | .92 | .92 | .92 | .92 |
| Max. Signal | .92 | .92 | .92 | .92 | .92 | .97 |

FIG. 11

| Node J | Start | Signal received from Node C | Signal received from Node L | Signal received from Node K | Signal received from Node I | Signal received from Node H |
|---|---|---|---|---|---|---|
| Hop Count To Max. Signal | 0 | 0 | 0 | 0 | 0 | 0 |
| Next Node Value | 0 | .80 | .80 | .80 | .85 | .92 |
| X-Flag | 1 | 1 | 1 | 1 | 1 | 1 |
| Local Signal | .97 | .97 | .97 | .97 | .97 | .97 |
| Max. Signal | .97 | .97 | .97 | .97 | .97 | .97 |

FIG. 12

EVENT LOCALIZATION WITHIN A DISTRIBUTED SENSOR ARRAY

BACKGROUND (1) Field of Invention

The present invention relates to a distributed sensor array, and more particularly to a system and method to enable a distributed group of sensors to cooperatively determine which sensor nodes in the group are closest to the source of a disturbance.

(2) Description of Related Art

There are a number of methods that have been developed for monitoring object presence and movement. However, many of these methods are limited in scope and are related to a narrow application, or require sophisticated sensors and centralized processing.

For example, U.S. Pat. No. 6,195,020, entitled, "Vehicle Presence Detection System," describes a method that provides for detecting the presence of a vehicle within the protected area of a four-gate railroad crossing, and determining its location and direction of motion. However, this method is tailored to a narrow application and uses centralized processing.

Kalman filters are often used in object tracking. However, using Kalman filters requires sophisticated sensor systems and generally centralized processing. As an example, the method in U.S. Pat. No. 6,311,129, entitled, "Positioning Process and System Thereof," makes use of a Kalman filter that processes the all-available measurements of a global positioning system.

There are also existing methods for tracking objects tagged with a specialized transmitting device. For example, the method in U.S. Pat. No. 6,154,139, entitled, "Method and System for Locating Subjects within a Tracking Environment," tracks objects that are tagged with a badge that transmits radio-frequency (RF) and infrared (IR) signals. This method relies on the line-of-sight aspects of the IR transmissions in order to localize the objects being tracked.

In a related work, U.S. Pat. No. 5,119,104, discloses a radio-location system for multi-path environments, such as for tracking objects in a facility. This system includes an array of receivers distributed within the tracking area, coupled to a system processor over a local area network (LAN). A transmitter located with each tracked object transmits, at selected intervals, spread-spectrum transmissions including at least a unique identifier (ID). Object location is accomplished by time-of-arrival (TOA) differentiation. In a low-resolution embodiment, each receiver of the array is assigned a specific location-area, and receives transmissions almost exclusively from objects located in that area, thereby eliminating the need for any time-of-arrival circuitry. In this system, data from all sensors must be collected at a central system processor for localization analysis.

Another related invention is described in U.S. Pat. No. 6,208,247, entitled, "Wireless Integrated Sensor Network using Multiple Relayed Communications." The patent relates to the remote detection, monitoring or tracking of vehicles, personnel, or other physical conditions. However, the patent is specifically concerned with hardware and communication protocols. It describes a highly integrated, miniature electronic sensing station that is specially adapted for use with other such sensing stations in a wireless, communicating network.

Other methods have been developed for motion prediction in a sensor array. These methods are concerned with predicting the future movement of a detected object and activating sensor nodes that may lie on the anticipated path of the moving object. In such methods, it is assumed that the moving object will only be detected within some limited range of the sensors, and therefore, only those sensor nodes closest to the moving object will detect it. Consequently, these methods do not specifically deal with the localization of objects that are potentially detected by many sensors at once.

The prior art in this area has generally relied on centralized processing of data from multiple sensors, or on limited range and line-of-sight properties of sensors to permit localization of sensed objects. Thus, a continuing need exists for a system using a distributed group of sensors to cooperatively determine which sensor nodes in the group are closest to the source of a disturbance, and for a system that requires no a priori knowledge of transmission intensity and allows for consistent activation of an exact number of nodes.

SUMMARY OF INVENTION

The present invention is a method to enable a distributed group of sensors, all capable of detecting a transmission or disturbance, to cooperatively determine which nodes in the group are closest to the source of the disturbance. This is applicable to sensing problems where only those nodes closest to the disturbance should be activated for power consuming signal processing tasks. A novel aspect of the solution is that it uses simple local communication between nodes to activate a pre-determined number of nodes surrounding the disturbance. This is accomplished by establishing a signal gradient that tells each node the maximum signal strength, local signal strength, and how many hops it is from the closest node. A particularly unique aspect is the use of a comparison between the transmitted local signal strength of neighboring nodes with a node's own local signal strength in order to determine successor nodes that descend the gradient from strongest to weakest signal strength. Using this information, it is then possible to propagate a signal from the closest node to any specified number of successor nodes to activate a fixed number of nodes that surround the source of the disturbance.

More specifically, the present invention relates to a method for event localization within a distributed sensor array using a plurality of sensor nodes. The method comprises an act of receiving a signal in at least one detecting node. The signal originates from an external disturbance and has a local signal at the detecting node such that the local signal reflects the proximity of the detecting node to the external disturbance. The method further comprises an act of exchanging information regarding the signal between the detecting node and nearby nodes. Additionally, the method comprises an act of localizing the external disturbance based on its relative proximity to the detecting node. Through receiving a signal that reflects a relative proximity of the detecting node to the external disturbance and exchanging that information between nearby nodes, the sensor array localizes the external disturbance.

In another aspect, the method comprises an act of receiving and measuring the local signal as having a local signal intensity that corresponds to each particular node. In this aspect, a local signal having a greater local signal intensity received at a detecting node indicates the node is relatively closer to the external disturbance than a detecting node that receives a local signal that receives a lesser local signal intensity.

In yet another aspect, the act of localizing the external disturbance further comprises an act of determining a closest node based on the local signal intensity. In this aspect, the detecting node with the relatively largest local signal intensity is assigned to have a maximum signal intensity and is designated as the closest node.

Additionally, the act of localizing the external disturbance further comprises acts of determining a successor node value for each node and determining the closest n nodes surrounding the external disturbance. The successor node value is the local signal intensity of a neighbor node to a selected node that is the next closest to the disturbance after the selected node, with such a neighbor node being designated as the successor node. These acts allow the sensor array to localize the external disturbance by determining the closest node and the closest n nodes surrounding the external disturbance.

In another aspect, the act of determining the closest node further comprises an act of estimating a relative distance from each node to the disturbance as measured in terms of a hop-count at each node. This act comprises acts of:
  initializing a hop-count variable to zero;
  initializing a maximum signal variable to the local signal intensity;
  comparing the maximum signal value of each node to the maximum signal values of neighboring nodes;
    when the maximum signal value of a neighboring node is greater than the maximum signal value of a selected node;
      setting the maximum signal value of the selected node to the maximum signal value of the neighboring node;
      setting the hop-count of the selected node so that it is incrementally greater than the hop-count value of the neighboring node;
    when the maximum signal value of the neighboring node is less than the maximum signal value of the selected node, then do nothing; and
  repeating the act of comparing until the maximum signal value of the neighboring nodes are equal to or less than the maximum signal value of the selected node.

In yet another aspect, the act of determining a successor node value for each node further comprises acts of:
  setting a selected node's successor node value at an initial value;
  determining whether a neighboring node has a local signal intensity less than a selected node's local signal intensity;
    when the neighboring node has a local signal intensity less than the selected node's local signal intensity, then setting a unique identifier for the selected node's successor node value such that the identifier identifies the neighboring node;
    otherwise, leaving the successor node value for the selected node unchanged;
  determining whether another neighboring node's local signal intensity is less than the selected node's local signal intensity but greater than the selected node's current successor node value;
    if another neighboring node's local signal intensity is less than the selected node's local signal intensity but greater than the selected node's current successor node value, then setting a unique identifier for the selected node's successor node value, such that the unique identifier identifies the other neighboring node; and
    otherwise, leaving the selected node's successor node value unchanged.

Furthermore, the unique identifier for a neighboring node is a representation of that node's local signal intensity, such that the act of determining a successor node value for each node comprises acts of:
  setting a selected node's successor node value at an initial value; determining if a neighboring node has a local signal intensity lesser than a selected node's local signal intensity;
    if the neighboring node has a local signal intensity lesser than a selected node's local signal intensity, then setting the neighboring node's local signal intensity as the selected node's successor node value;
    otherwise, leaving the successor node value for the selected node unchanged as the neighbor node's local signal intensity is not a successor node value for the selected node;
  determining whether another neighboring node's local signal intensity is greater in signal intensity than the selected node's successor node value, but lesser in signal intensity than the selected node's local signal intensity;
    if another neighboring node's local signal intensity is greater in signal intensity than the selected node's successor node value, but lesser in signal intensity than the selected node's local signal intensity, then setting the another neighboring node's local signal intensity as the selected node's successor node value; and
    otherwise, leaving the selected node's successor node value unchanged.

In another aspect, the act of determining the closest n nodes further comprises acts of:
  determining the successor node value for the closest node;
  selecting a successor node, where the local signal intensity of the successor node equals the successor node value;
  determining a successor node value for the successor node; and
  repeating acts of determining the successor node value for the closest node and selecting a successor node until n nodes have been selected, the $n^{th}$ node being a predetermined number of nodes closest to the external disturbance.

In yet another aspect, the act of localizing the external disturbance further comprises an act of activating a predetermined number of sensor nodes to an active state, such that the predetermined number of nodes are the n nodes closest to the external disturbance as determined by their respective local signal strengths.

Additionally, the act of localizing the external disturbance further comprises an act of activating a predetermined number of sensor nodes to an active state, where only those nodes that are within a predetermined hop-count from the node closest to the disturbance are activated.

The method further comprises acts of:
  receiving a second signal at least one detecting node, the second signal originating from a second external disturbance and having a second local signal such that the second local signal reflects a relative proximity of the detecting node to the second external disturbance;
  exchanging information regarding the second signal between the detecting node and nearby nodes; and
  localizing the second external disturbance based on its relative proximity, whereby by receiving a second signal that reflects a relative proximity to the second external disturbance and exchanging that information between nearby nodes, the sensor array localizes the second external disturbance thereby allowing for triangulation of multiple disturbances.

Finally, as can be appreciated by one in the art, the present invention also comprises a system and computer program product configured to perform the operations of the method described herein.

BRIEF DESCRIPTION OF THE DRAWINGS

The objects, features, and advantages of the present invention will be apparent from the following detailed descriptions of the various aspects of the invention in conjunction with reference to the following drawings, where:

FIG. 9 is a table illustrating information transmitted, received, and recorded by sensor Node A, of FIGS. 7 and 8;

FIG. 10 is a table illustrating information transmitted, received, and recorded by sensor Node E, of FIGS. 7 and 8;

FIG. 11 is a table illustrating information transmitted, received, and recorded by sensor Node H, of FIGS. 7 and 8;

FIG. 12 is a table illustrating information transmitted, received, and recorded by sensor Node J, of FIGS. 7 and 8.

DETAILED DESCRIPTION

Figure 1:
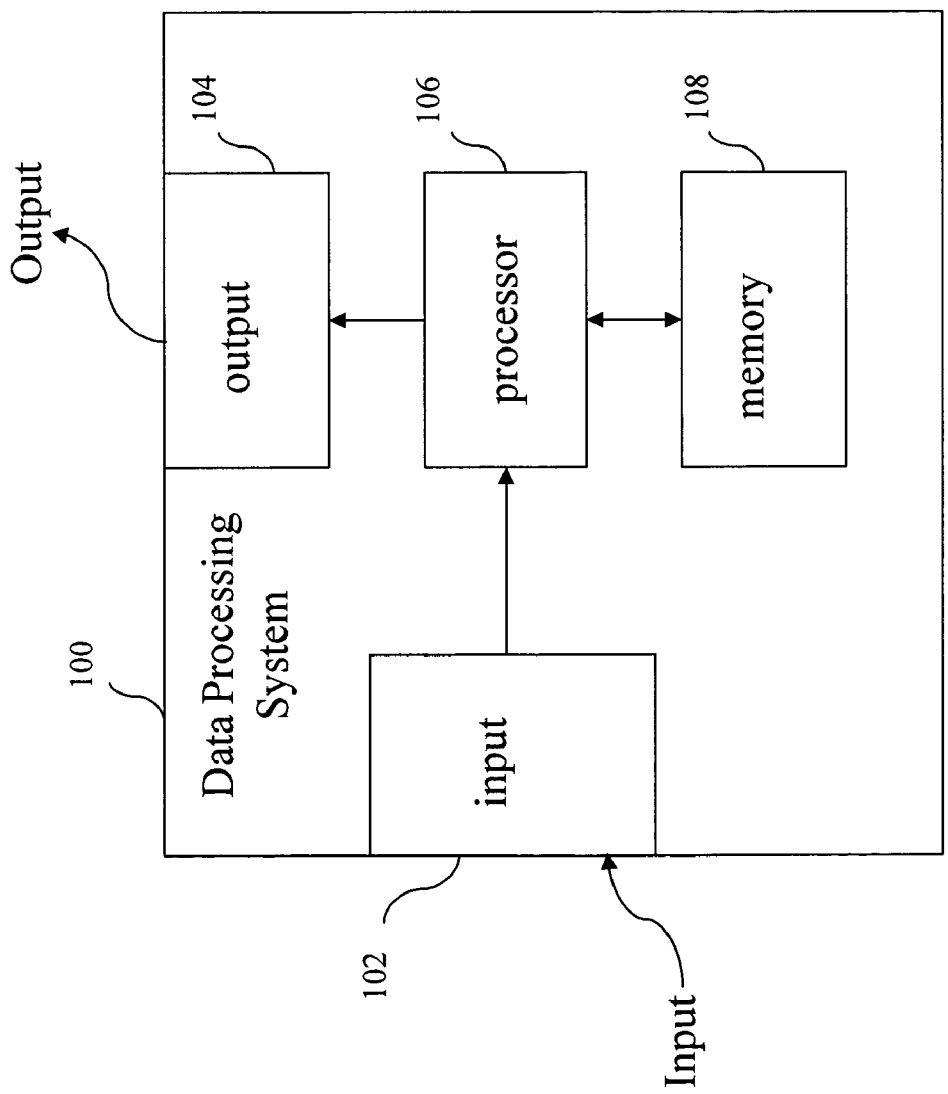
FIG. 1 illustrates a component diagram depicting components of a data processing system according to the present invention.

The present invention relates to a distributed sensor array, and more particularly to a system and method to enable a distributed group of sensors to cooperatively determine which sensor nodes in the group are closest to the source of a disturbance. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is given as a central resource for the reader. Next, a description of various principal aspects of the present invention is provided. Then, an introduction is provided to provide the reader with a general understanding of the present invention. Finally, a description of various aspects of the present invention is provided to give an understanding of the specific details.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Hop-Count—The term "hop-count" refers to a number provided to each node, where the number reflects the number of nodes that separate a selected node from the node with a maximum signal.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Local Signal—The term "local signal" refers to a signal intensity as recorded by each node. The signal intensity decreases as it travels further from the external disturbance, such that nodes relatively farther from the external disturbance have local signal values smaller than nodes relatively closer to the external disturbance.

Maximum Signal—The term "maximum signal" refers to the signal intensity as recorded by the node closest to the external disturbance. In such a node, the local signal equals the maximum signal.

Successor node Value—The term "next node value" refers to the value attributed to a nearby node that is the next incrementally decreasing node in relative distance from the external disturbance. The next node value is typically the local signal strength of the next incrementally decreasing node, but may also include a unique identifier for that node.

(2) Principal Aspects

The present invention has three "principal" aspects. The first is a distributed sensor array system. The distributed sensor array system is typically in the form of a computer system operating software or in the form of a "hard-coded" instruction set that is used with an actual sensor array. This system may be incorporated into a wide variety of devices that provide different functionalities. The second principal aspect is a method, typically in the form of software, operated using a data processing system (computer). The third principal aspect is a computer program product. The computer program product generally represents computer-readable code stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a distributed sensor array system of the present invention is provided in FIG. 1. It is important to note that the system may be centralized, or may be decentralized, where the components described below are provided in each and every sensor node. The distributed sensor array system 100 comprises an input 102 for receiving information from at least one sensor for detecting signal intensity from a disturbance. Note that the input 102 may include multiple "ports." Typically, input is received from at least one sensor; non-limiting examples of such sensors include chemical, radiation, sound, motion, pressure, and signal sensors. An output 104 is connected with the processor for providing information regarding the presence and/or intensity of signals(s) to other systems and/or sensors in order that a network of computer systems and/or sensors may serve as a distributed sensor array system. Output may also be provided to other devices or other programs; e.g., to other software modules, for use therein. The input 102 and the output 104 are both coupled with a processor 106, which may be a general-purpose computer processor or a specialized processor designed for use with the present invention. The processor 106 is coupled with a memory 108 to permit storage of data and software to be manipulated by commands to the processor.

Figure 2:
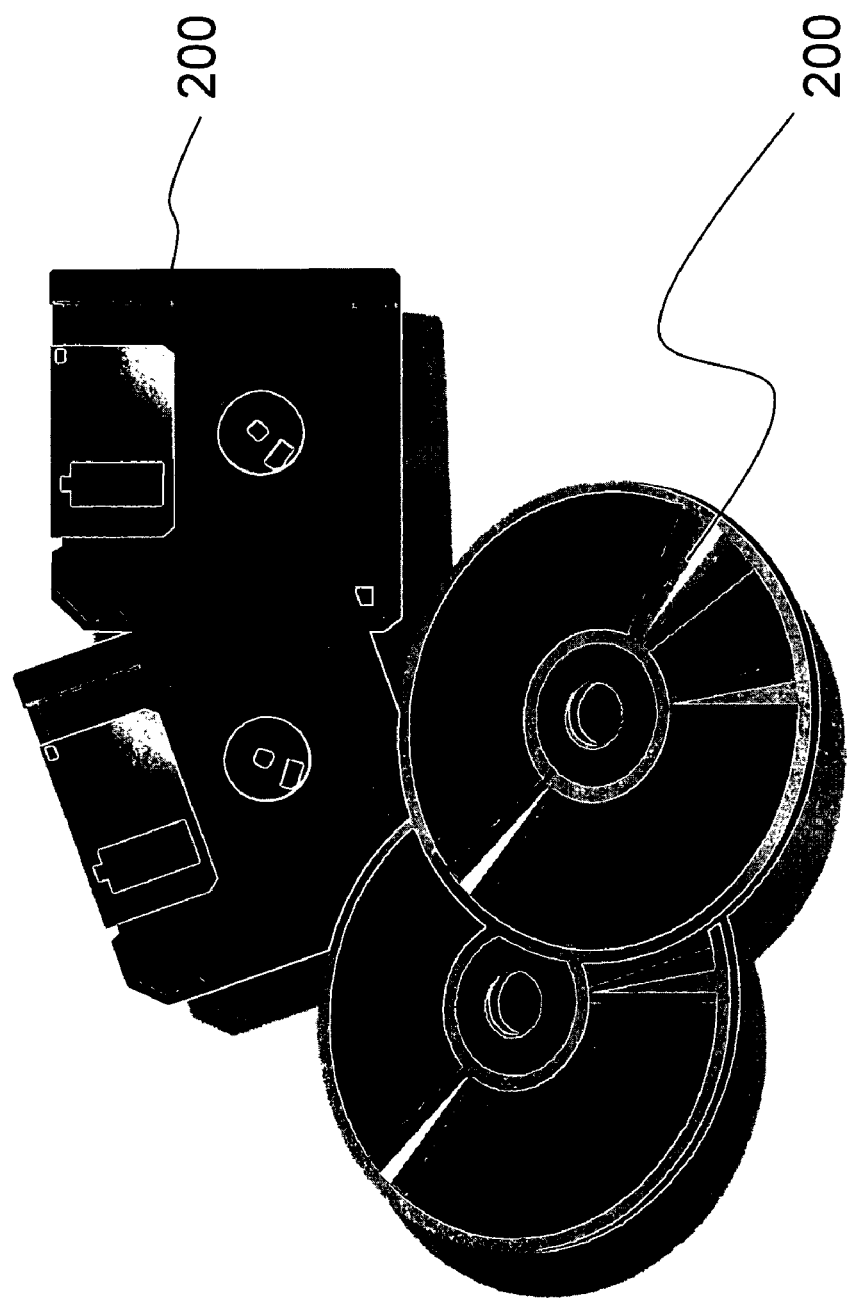
FIG. 2 illustrates a diagram of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

The present invention is a method to enable a distributed group of sensors, all capable of detecting a transmission or disturbance, to cooperatively determine which nodes in the group are closest to the source of the disturbance. This is applicable to sensing problems where only those nodes closest to the disturbance should be activated for power consuming signal processing tasks. A novel aspect of the solution is that it uses simple local communication between nodes to activate a pre-determined number of nodes surrounding the disturbance. This is accomplished by establishing a signal gradient that tells each node the maximum signal strength, local signal strength, and how many hops it is from the closest node. A particularly unique aspect is the use of a comparison between the transmitted local signal strength of neighboring nodes with a node's own local signal strength in order to determine successor nodes that descend the gradient from strongest to weakest signal strength. Using this information, it is then possible to propagate a signal from the closest node to any specified number of successor nodes to activate a fixed number of nodes that surround the source of the disturbance.

The present invention is intended for use in the application of distributed sensor arrays in which individual sensor nodes may be set in active versus idle states, where the active state allows more data processing to be done, but also consumes more energy. Although the present invention also works with all nodes being active, those nodes that are to be made active should be in the neighborhood of the disturbance, and preferably should surround the disturbance so that they can cooperatively work to localize it. In a large sensor array, in some circumstances, it may be preferable to keep most sensor nodes in an idle or monitoring state so as to minimize power consumption. To avoid the large power drain of long-range communications, information may be shared between nodes only by means of messages sent between neighboring or nearby nodes. Use of the present invention enables the selective activation of a pre-determined number of nodes surrounding a disturbance using local information exchanged between nodes. An advantage of the present invention is that it does this in a completely distributed manner without ever having to collect and combine data from multiple sensors for processing in a single location. This invention also has the advantage of not requiring any specific location information from nodes or any unique identities of individual nodes.

As can be appreciated by one in the art, the present invention has several applications. As a non-limiting example, a plurality of chemical sensors can be distributed about a space to detect the presence of a chemical leak, with the nodes receiving a chemical signal cooperating with each other to localize the source of the chemical. Since a very large number of nodes will potentially receive the signal, it is important to have only a small number of nodes close to the source perform the localization task. This problem could easily be solved if every node could relay information back to a central location for processing, but this would require excessive amounts of transmission power and bandwidth. This invention solves this problem by using local communication between nodes, thereby conserving power.

(4) Description

This invention provides a method to enable a distributed group of sensors, all capable of detecting a transmission or disturbance, to cooperatively determine which nodes in the group are closest to the source of the disturbance. This invention is intended for use in the application of distributed sensor arrays in which individual sensor nodes may be set in active versus idle states, where the active state allows more data processing to be done, but also consumes more energy. The purpose of the invention is to be able to respond to a disturbance by setting some small portion of nodes into an active state while leaving the remaining nodes in an idle state. Those nodes that are made active are in the neighborhood of the disturbance, and tend to surround the disturbance so as to maximize their capacity to cooperatively localize the disturbance. The method works exclusively through exchange of information between nearby nodes and has been devised so as to avoid having to collect information from multiple sensors into a central location for processing. Despite being completely decentralized, the method is capable of ensuring that only a specified number of nodes become active upon detecting a disturbance.

For purposes of this invention, it is presumed that sensors register a disturbance as some received signal. Non-limiting examples of such signals include chemical, radiation, sound, motion, pressure, and transmission (e.g., radio-frequency)

signals. Each sensor is capable of obtaining a corresponding signal strength related to any disturbance, and the signal strength is dependent upon both the intensity of the disturbance as well as the proximity to the disturbance. It is also presumed that the signal strength decreases roughly monotonically in relation to the distance between the disturbance and any sensor, although absolute monotonicity is not required.

Figure 3:
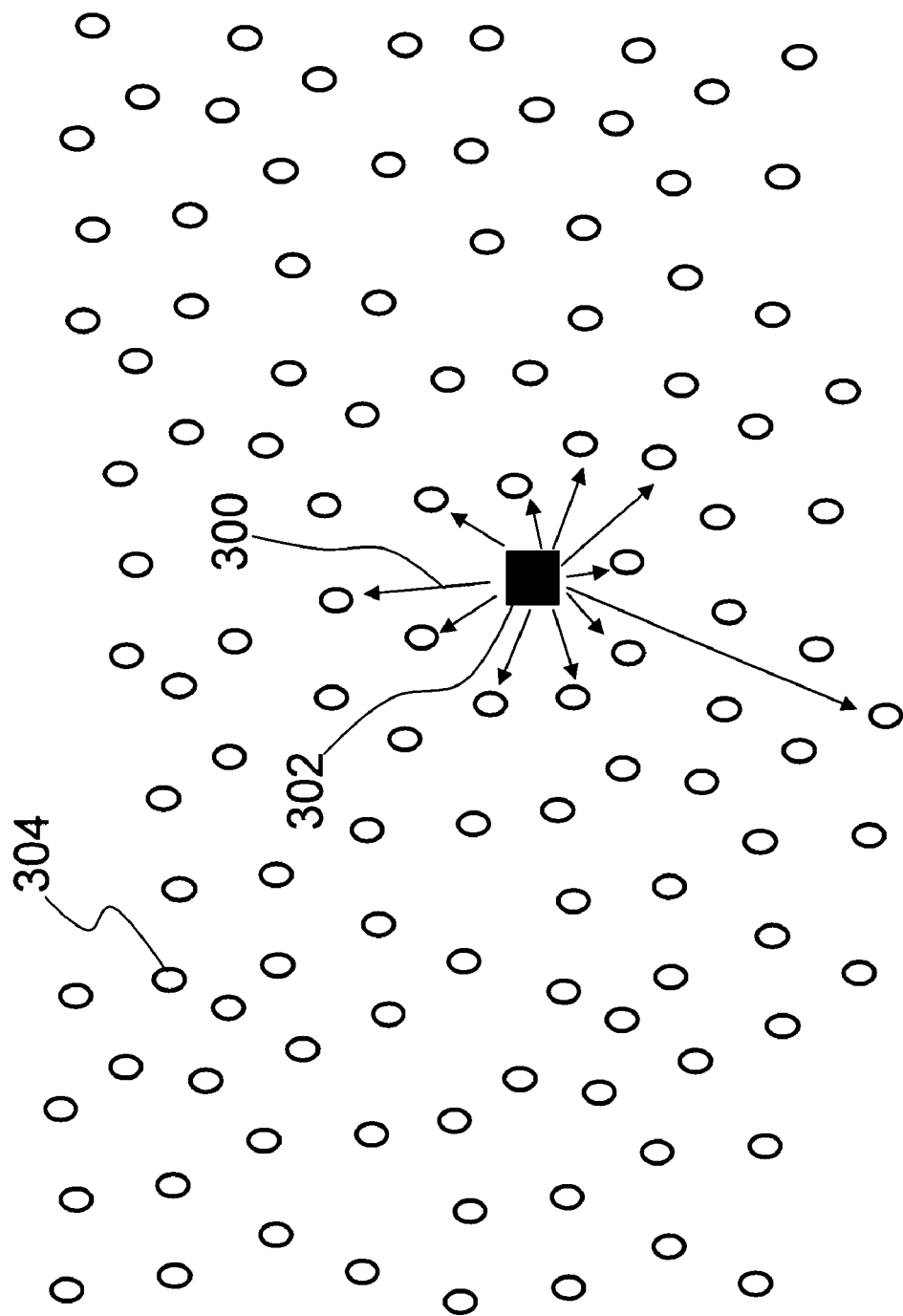
FIG. 3 illustrates an exemplary transmission event, where an event has emitted a signal.
Figure 4:
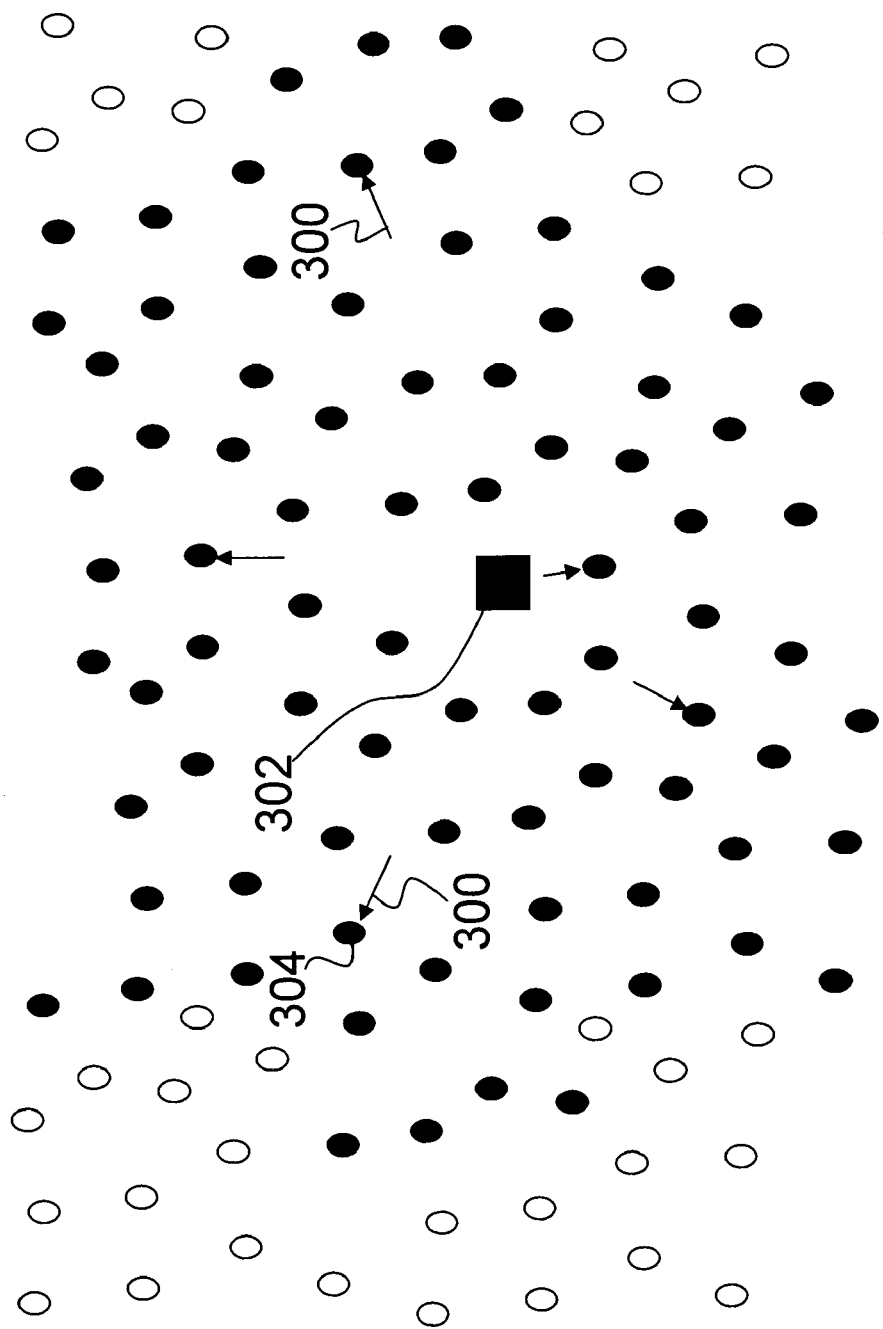
FIG. 4 illustrates an exemplary detection event, where a plurality of sensor nodes have detected the signal.

The method comprises the following acts:

(4.1) Detection Act:

As shown in FIG. 3, before event localization, a transmission event must occur where a signal 300 is transmitted from an external disturbance 302 within a distributed sensor array. The distributed sensor array contains a plurality of sensor nodes 304 that surround the external disturbance 302, with the sensor nodes 304 initially set to an idle state. The disturbance 302 is any type of event that emits a signal 300, a non-limiting example of which includes a radio-frequency (RF) transmission. As shown in FIG. 4, the first act in event localization is a detection act in which various nodes 304 receive the signal 300 (having a signal intensity) originating from the external disturbance 302, and thereafter record the signal intensity of the received signal 300. The darkened circles in FIG. 4 denote nodes 304 that have received the signal 300, while the clear circles note nodes 304 that have not received the signal 300. To avoid confusion, the signal 300 received by each node 304 will be referred to as the node's local signal intensity. Note that this could include any form of detection where the signal intensity of the detection is reduced as a function of the distance between the detecting node and the disturbance. If multiple disturbances are present, nodes can record the maximum signal intensity received within a given time window. Any number of detection methods may be used, with the only requirement being that the intensity of the detection signal decreases with increasing distance between the object being detected and the detecting node.

Figure 5:
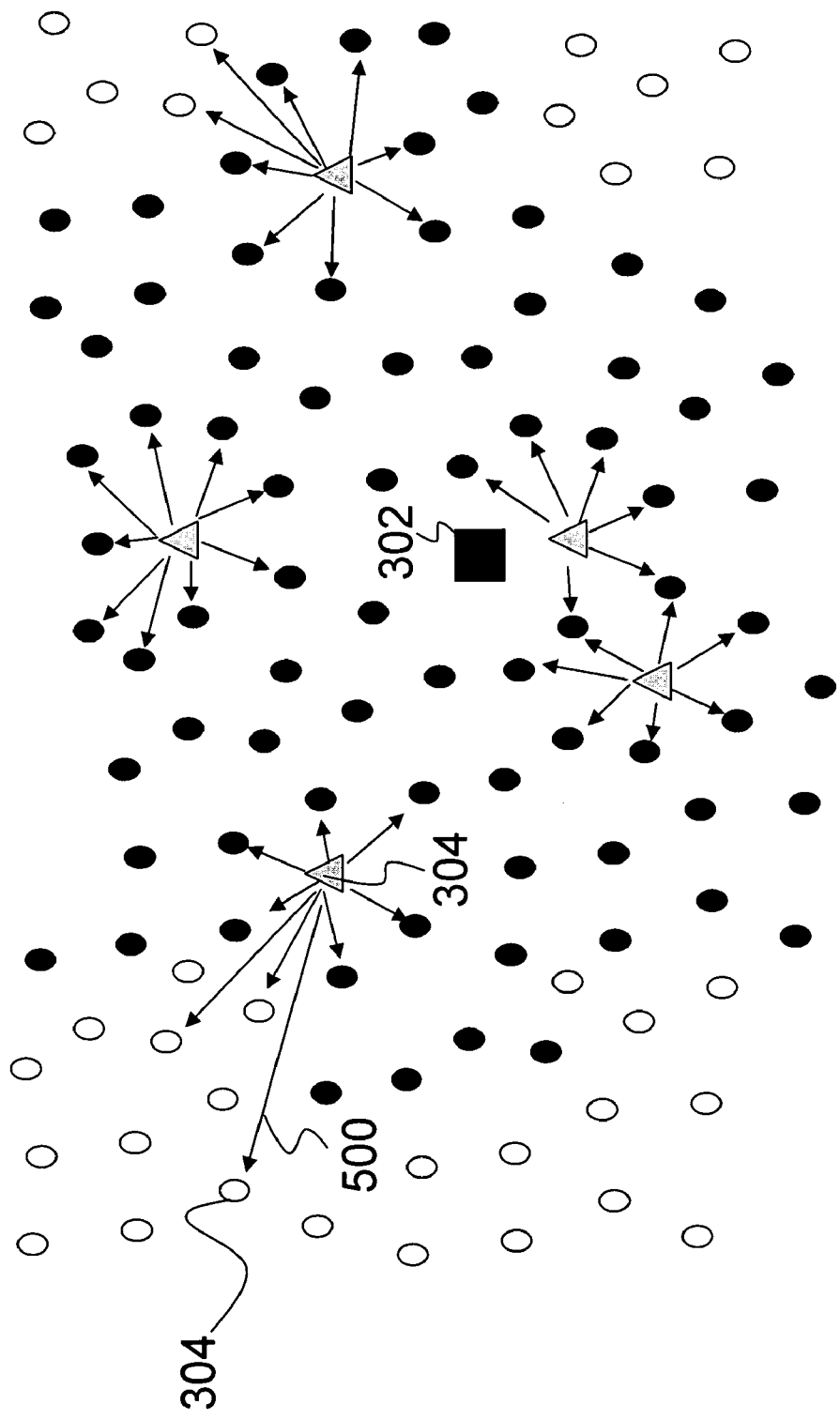
FIG. 5 illustrates an exemplary transmission event, where local sensor nodes transmit information about the event depicted in FIG. 3, to nearby neighbor sensor nodes.

(4.2) Propagation Act:

As shown in FIG. 5, the next act is an iterative propagation operation in which nodes 304 that have detected the external disturbance 302 exchange information 500 about this event with nearby nodes 304. At the completion of this act, every node 304 will have recorded three things: 1) the maximum signal intensity which corresponds to the maximum local signal strength recorded by any node (which will correspond to the local signal intensity recorded by the node closest to the disturbance), 2) the number of intervening nodes between a given node and the node closest to the disturbance, and 3) a unique identifier (ID) that identifies the node amongst immediately neighboring nodes (i.e., an identifier that uniquely identifies a successor node from the set of neighboring nodes that have a weaker local signal strength than the given node, where the chosen successor node has received a local signal strength that is the largest for all members of this set). Although it is possible to provide unique ID's for each node, it is preferable to use the local signal intensity value recorded by that neighboring node.

This act includes a transmitting task and a receiving task involving the exchange of three data elements: a hop-count, a local signal intensity (local-sig), and a maximum signal intensity (max-sig). Once a node has detected a signal, it sets its hop-count value to an initial value (e.g., zero), its successor node value to an initial value (e.g., zero), its transmit-flag (xmit-flag) value to a transmit value (e.g., one), and sets the variables local-sig and max-sig to the intensity of the particular node's local signal strength. The transmitting and receiving tasks are then repeated as follows: initial value (4.2.1) The Transmitting Task:

If the xmit-flag is 1, then the node transmits hop-count+1, its local-sig, and its max-sig. The xmit-flag is then set to 0. As can bed appreciated by one skilled in the art, the numbers used herein can be altered without changing the scope of the invention and are used for illustrative purposes only. For example, if the xmit-flag is 1, then the selected node sets its hop-count so that it is incrementally greater (e.g., hop-count+1) than the hop-count value of the neighboring node.

(4.2.2) The Receiving Task:

Upon receipt of a message from a neighboring node, data in the message is saved as follows:

a. the hop-count data is saved as message (msg)-hop-count;
b. the local-sig data is saved as msg-sig-intensity; and
c. the max-sig data is saved as msg-max-signal.

If the msg-max-sig is greater than or equal to the max-sig, AND if the msg-sig-intensity is greater than the local-sig, then the node updates internal variables as follows:

a. max-sig=msg-max-sig;
b. hop-count=msg-hop-count; and
c. xmit-flag=1.

This has the effect of updating the node such that it will now have a max-sig value equal to the largest max-sig value of any values received from its neighbors, and a hop-count value that is one (or incremental equivalent) larger than the hop-count of the neighbor having the largest max-sig value. The xmit-flag is set to one so that this node will re-transmit the new hop-count and max-sig values it is now using.

If msg-sig-intensity is less than the local-sig, AND if the msg-sig-intensity is greater than the successor node, then the node updates internal variables as follows:

successor node=msg-sig-intensity.

This enables a node to identify a neighboring successor node that has the largest local-sig value that is still less than its own local-sig value. Since local-sig values decrease with distance from the disturbance, this allows each node (selected node) to be able to uniquely identify the node that is the next furthest from the disturbance than the selected node. This information is needed in the identification act that follows.

The transmitting and receiving tasks described above are repeated at each node as long as it continues to receive messages from other nodes, or has a xmit-flag variable set to one (or other equivalent marker).

At the completion of the Propagation Act, all nodes will have the same max-sig value and this value will be equal to the intensity of the detection signal at the node closest to the disturbance. In addition, a gradient in hop-count values will have been established such that nodes further from the disturbance will have hop-count values that are larger than those possessed by nodes closer to the disturbance. If there are multiple disturbances, a triangulation is implicitly formed around each disturbance such that each node retains the maximum signal for whichever triangle it is a member of. A non-limiting example of such a triangulation includes a Dulaney triangulation. A unique aspect of this invention is that such triangulations will occur, and this is due to the fact that gradients are only allowed to propagate from nodes that have received stronger signals to nodes that have received weaker signals, and this is enabled by each node relaying its own received signal strength (i.e., local-sig) along with that of the current maximum. This also provides each node with a convenient identifier for its successor node in the gradient.

(4.3) Identification Act

Figure 6:
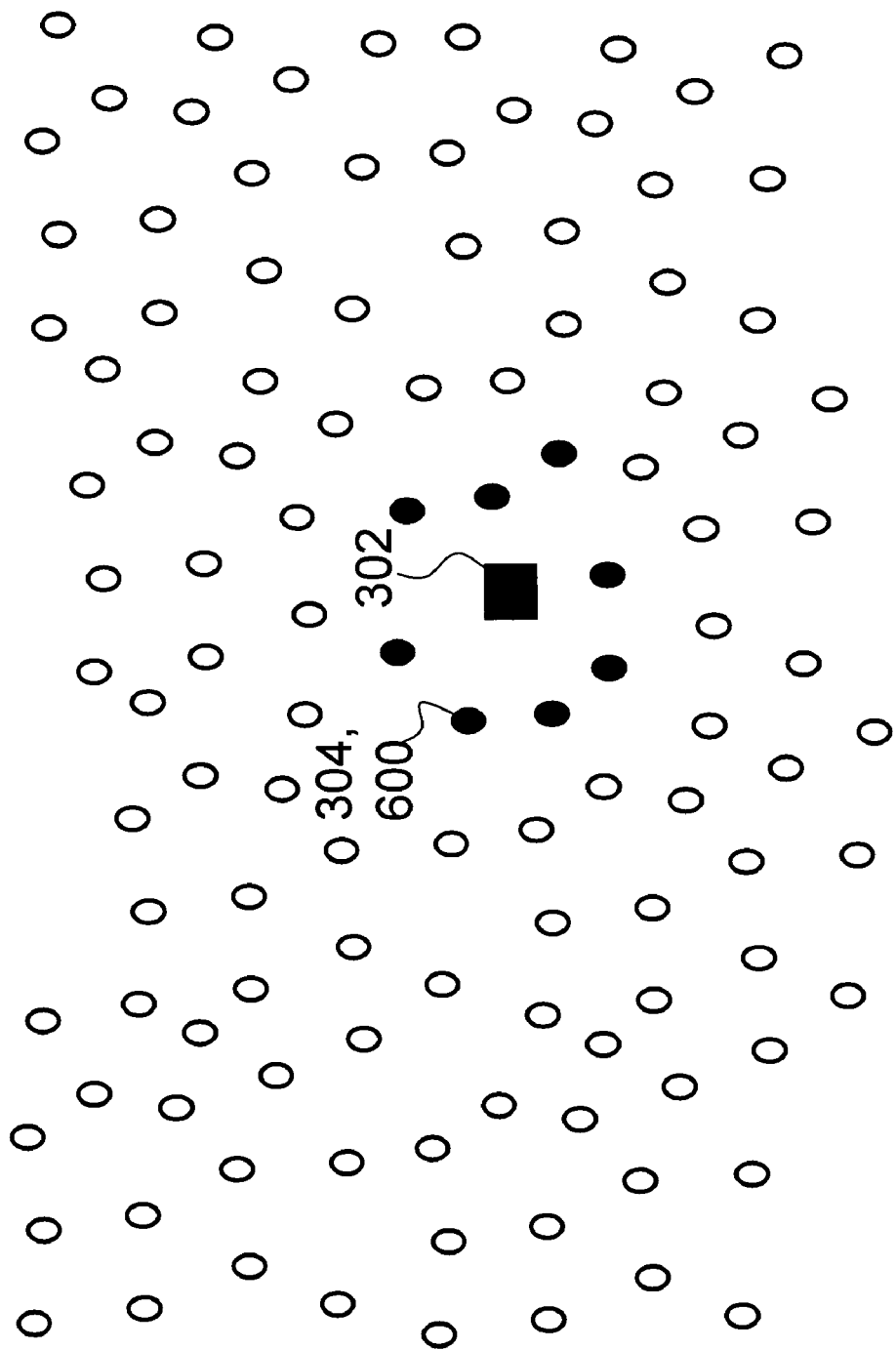
FIG. 6 illustrates an exemplary designated number of sensor nodes becoming activated to localize the event depicted in FIG. 3.

As shown in FIG. 6, the third act is the Identification Act, in which a specified number of nodes 304 closest to the disturbance 302 are set into an active state 600 (n nodes with the $n^{th}$ node being a predetermined number of nodes closest to the external disturbance). To do this, the present invention utilizes the fact that the prior act leaves every node with the current maximum received signal intensity for all nodes (within its Dulaney triangle).

As an optional part of this act, only those nodes that are within a certain number of hops (i.e., closest n nodes) from the closest node (i.e., the node closest to the disturbance as being evidenced by having a max-sig equal to a local-sig) can be activated. Each node looks at its hop-count value and becomes activated if it is less than a pre-determined number. This will yield a cluster of activated nodes (i.e., closest n nodes) surrounding the detected disturbance. All nodes that are not activated can ignore further communications related to this act. At this point, there will be only one node that has its own local signal intensity equal to the maximum signal intensity. Such a node will be designated as the node closest to the disturbance.

All activated nodes run the test:

If (max-sig=local-sig) then selected=true;
    If selected=true, then the node is the closest to the disturbance and it will then transmit a SELECT message, which includes the value of the successor node and a count value that is equal to one less than the total number of selected nodes that are desired to have surrounding the disturbance.

Upon receiving a SELECT message, all active nodes will compare the successor node value with their local-sig value to determine if they are next in sequence in proximity to the disturbance. Note that having the successor node value be a unique ID for the receiving node could also do this. The matching node (i.e., the node where the local-sig value equals the successor node value) will then locally set selected=true, and re-transmit the SELECT message using its own value for successor node and decrementing its received count value by one. This operation is performed recursively until the count value is decremented to zero and no further transmissions are then performed.

The non-limiting exemplary pseudo code below describes the basic procedures that need to be run by each sensor node in the network. One skilled in the art can appreciate that there are numerous ways to create code to perform the operations described herein. Accordingly, the pseudo code below is not meant to be limiting but is solely used for illustrative purposes. The two functions rx-message and tx-message stand for receive and transmit operations performed by each node. Any node that receives a message from its neighbors will determine if the message is a "propagate" message or a "select" message. Nodes run their "propagate" operations repeatedly until their tx-ready flag remains zero.

```
to detect :power
    set sig__strnth :power
    set tx__ready sig__strnth
    set hops 0
    set best 0
    set next 0
    set active 0
end
to propagate
    if tx__ready > 0 [
    let [:x xcor
        :y ycor
        :var tx__ready
        :var2 sig__strnth
        :phops hops + 1]
    set tx__ready 0
    tx message propagate :var :var2 :phops
    ]
end
to rx__message propagate :val :val2 :phops
    set best max sig__strnth best
    if (:val > best) and (:val2 > sig__strnth)
        [set best :val
        set hops :phops
        set tx__ready :val]
    if :val2 < sig__strnth
        [set next max :val2 next]
end
to activate__close
    ifelse (hops < 2)
        [set active true]
        [set active false]
end
to initiate__select :count
    tx__message select :count, next
end
to rx__message select :count :identifier
    if :identifier = sig__strength
        [set selected true
        tx__message select (:count − 1), next]
end
```

Figure 7:
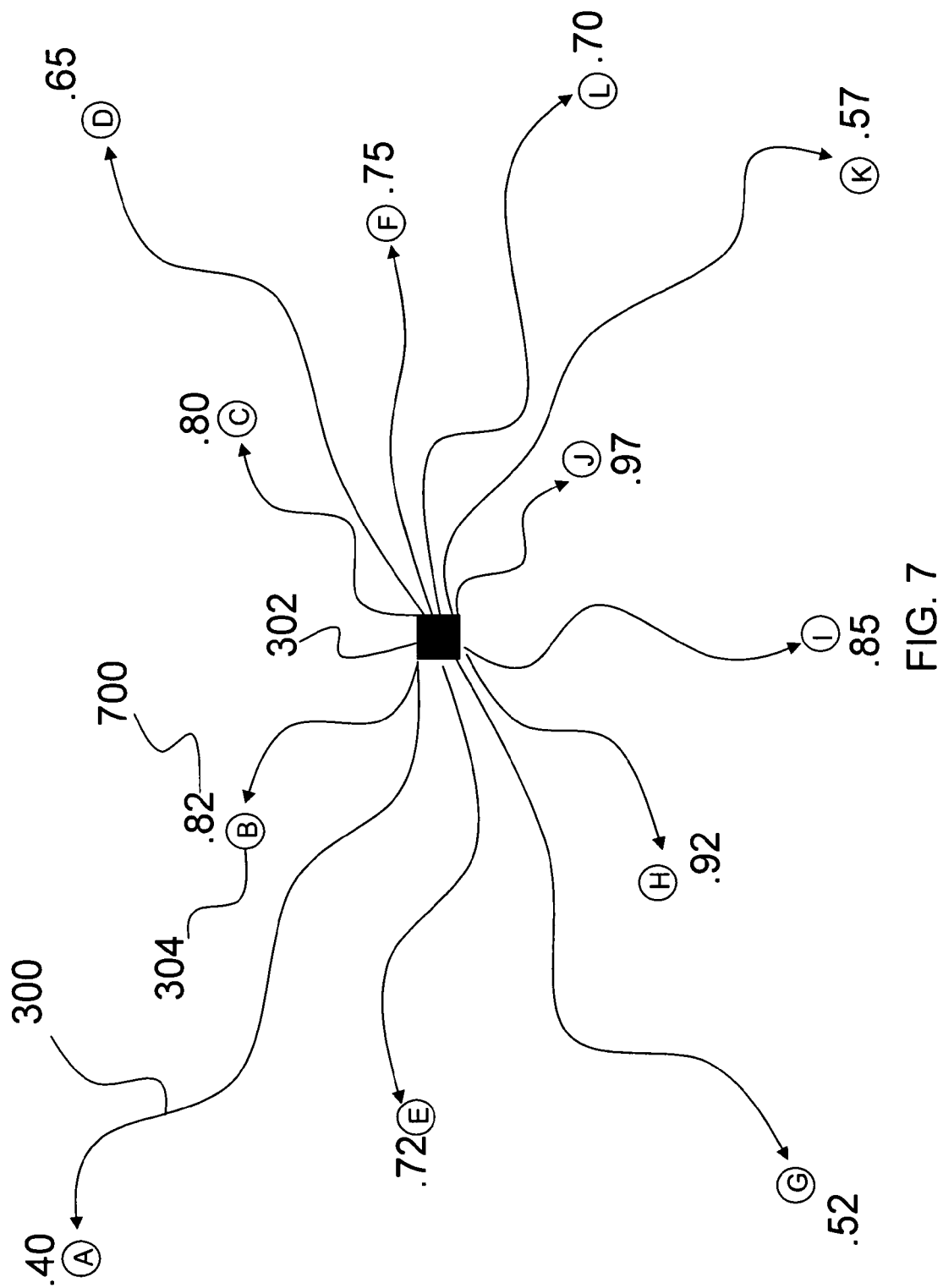
FIG. 7 illustrates another exemplary transmission event and detection event, with each sensor node receiving and recording a local transmission signal intensity.

For further clarity, FIG. 7 illustrates an exemplary transmission event and detection event, with each sensor node 304 receiving and recording a local transmission signal intensity 700. As shown in FIG. 7, the local transmission signal intensity 700 is largest at the nodes 304 closest to the disturbance 302, and decreases as the signal 300 travels further from the disturbance 302.

Figure 8:
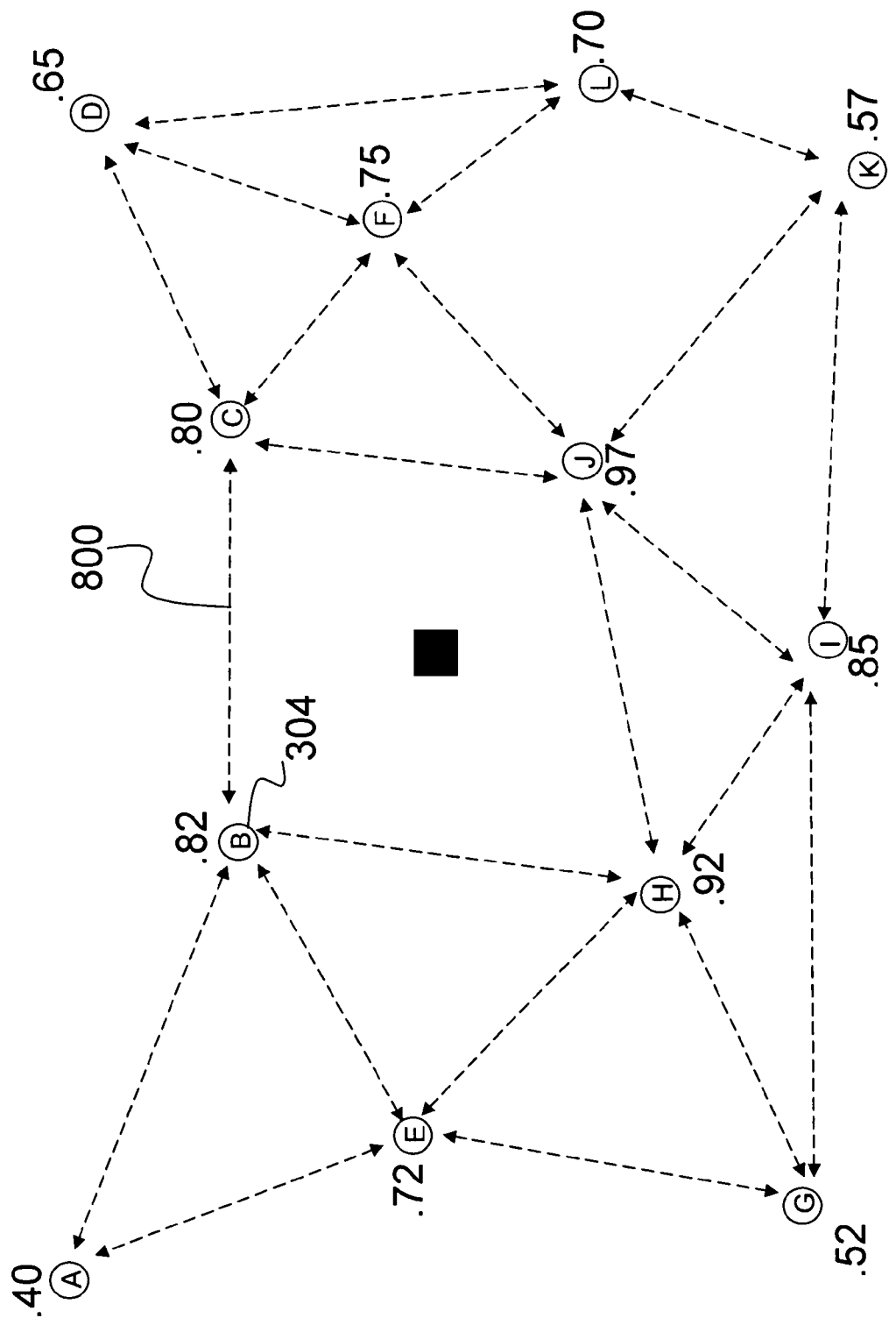
FIG. 8 illustrates another exemplary transmission event, where local sensor nodes transmit information about the event depicted in FIG. 7, to nearby sensor nodes.

FIG. 8 illustrates an exemplary transmission event, where local sensor nodes 304 transmit 800 information about the event depicted in FIG. 7, to nearby sensor nodes 304. As the information is transmitted 800 to nearby nodes 304, each node becomes progressively updated with the maximum signal intensity and the next node value.

FIGS. 9 through 12 include tables illustrating an exemplary update process for various sensor nodes depicted in FIGS. 7 and 8. FIG. 9 is a table illustrating information transmitted, received, and recorded by sensor Node A, of FIGS. 7 and 8. Since Node A has the smallest relative local signal, there is no next node value for Node A. As Node A receives various signals from nearby nodes, it continuously updates the max-signal value and its hop-count value (i.e., the distance (in number of nodes) between Node A and the node that transmitted the max-signal to Node A).

FIG. 10 is a table illustrating information transmitted, received, and recorded by sensor Node E. As can be seen in FIG. 10, Node E's next node value and max-signal value are updated as Node E receives various signals from nearby nodes.

FIG. 11 is a table illustrating information transmitted, received, and recorded by sensor Node H. In this illustration, as Node H receives several signals from nearby nodes, it updates both its next node value and max-signal value.

FIG. 12 is a table illustrating information transmitted, received, and recorded by sensor Node J. Although Node J receives several signals from nearby nodes, none of their signals include max-signal intensities greater than Node J's local signal intensity. Accordingly, Node J is designated as the node closest to the disturbance.

Figure 13:
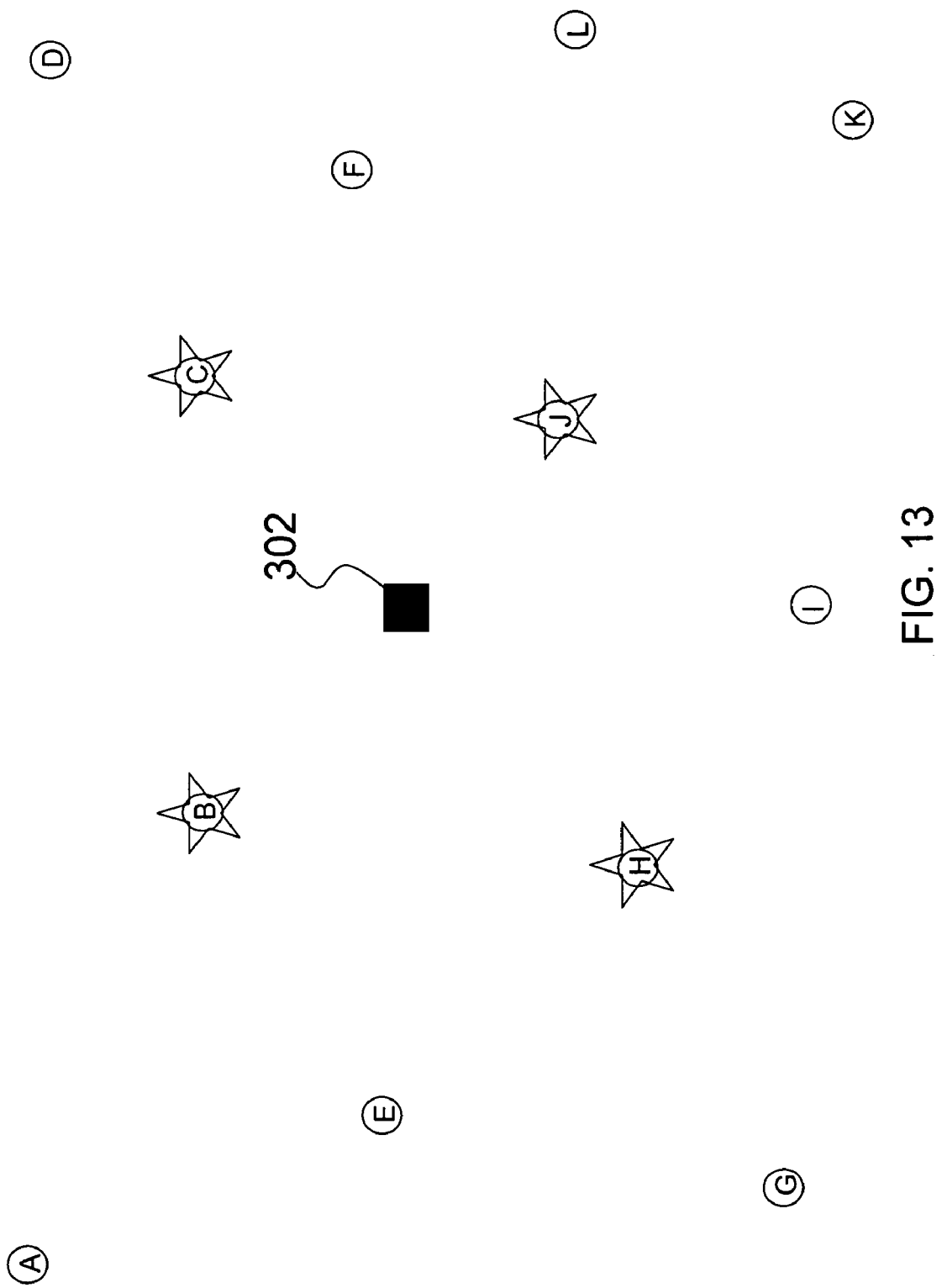
FIG. 13 is an illustration of sensor Nodes, B, C, H, and J, becoming activated to localize the event depicted in FIG. 7.

FIG. 13 is an illustration of sensor Nodes, B, C, H, and J, becoming activated to localize the event 302 depicted in FIG. 7. Note that these nodes tend to surround the source of the transmission, thereby providing better opportunity for triangulation on the source should finer position estimation be required.

What is claimed is:

1. A method for event localization within a distributed sensor array using a plurality of sensor nodes, the method comprising acts of:
    receiving a signal in at least one detecting node, the signal originating from an external disturbance and having a local signal at the detecting node such that the local signal reflects the proximity of the detecting node to the external disturbance;
    exchanging information regarding the signal between the detecting node and nearby nodes; and
    localizing the external disturbance based on its relative proximity to the detecting node, whereby through receiving a signal that reflects a relative proximity of the detecting node to the external disturbance and exchanging that information between nearby nodes, the sensor array localizes the external disturbance.

2. A method as set forth in claim 1, further comprising an act of receiving and measuring the local signal as having a local signal intensity that corresponds to each particular node, such that a local signal having a greater local signal intensity received at a detecting node indicates the node is relatively closer to the external disturbance than a detecting node that receives a local signal that receives a lesser local signal intensity.

3. A method as set forth in claim 2, wherein the act of localizing the external disturbance further comprises an act of:
    determining a closest node based on the local signal intensity, such that the detecting node with the relatively largest local signal intensity is assigned to have a maximum signal intensity and is designated as the closest node.

4. A method as set forth in claim 2, wherein the act of localizing the external disturbance further comprises acts of:
    determining a successor node value for each node, the successor node value being the local signal intensity of a neighbor node to a selected node that is the next closest to the disturbance after the selected node, with such a neighbor node being designated as the successor node; and
    determining the closest n nodes surrounding the external disturbance, thereby allowing the sensor array to localize the external disturbance by determining the closest node and the closest n nodes surrounding the external disturbance.

5. A method as set forth in claim 2, wherein the act of determining the closest node further comprises an act of estimating a relative distance from each node to the disturbance as measured in terms of a hop-count at each node, comprising acts of:
    initializing a hop-count variable to zero;
    initializing a maximum signal variable to the local signal intensity;
    comparing the maximum signal value of each node to the maximum signal values of neighboring nodes;
        when the maximum signal value of a neighboring node is greater than the maximum signal value of a selected node;
            setting the maximum signal value of the selected node to the maximum signal value of the neighboring node;
            setting the hop-count of the selected node so that it is incrementally greater than the hop-count value of the neighboring node;
        when the maximum signal value of the neighboring node is less than the maximum signal value of the selected node, then do nothing; and
    repeating the act of comparing until the maximum signal value of the neighboring nodes are equal to or less than the maximum signal value of the selected node.

6. A method as set forth in claim 4, wherein the act of determining a successor node value for each node further comprises acts of:
    setting a selected node's successor node value at an initial value;
    determining whether a neighboring node has a local signal intensity less than a selected node's local signal intensity;
        when the neighboring node has a local signal intensity less than the selected node's local signal intensity, then setting a unique identifier for the selected node's successor node value such that the identifier identifies the neighboring node;
        otherwise, leaving the successor node value for the selected node unchanged;
    determining whether another neighboring node's local signal intensity is less than the selected node's local signal intensity but greater than the selected node's current successor node value;
        if another neighboring node's local signal intensity is less than the selected node's local signal intensity but greater than the selected node's current successor node value, then setting a unique identifier for the selected node's successor node value, such that the unique identifier identifies the other neighboring node; and
        otherwise, leaving the selected node's successor node value unchanged.

7. A method as set forth in claim 6, wherein the unique identifier for a neighboring node is a representation of that node's local signal intensity, such that the act of determining a successor node value for each node comprises acts of:
    setting a selected node's successor node value at an initial value; determining if a neighboring node has a local signal intensity lesser than a selected node's local signal intensity;
        if the neighboring node has a local signal intensity lesser than a selected node's local signal intensity, then setting the neighboring node's local signal intensity as the selected node's successor node value;
        otherwise, leaving the successor node value for the selected node unchanged as the neighbor node's local signal intensity is not a successor node value for the selected node;
    determining whether another neighboring node's local signal intensity is greater in signal intensity than the selected node's successor node value, but lesser in signal intensity than the selected node's local signal intensity;
        if another neighboring node's local signal intensity is greater in signal intensity than the selected node's successor node value, but lesser in signal intensity than the selected node's local signal intensity, then setting the another neighboring node's local signal intensity as the selected node's successor node value; and
        otherwise, leaving the selected node's successor node value unchanged.

8. A method as set forth in claim 4, wherein the act of determining the closest n nodes further comprises acts of:
  determining the successor node value for the closest node;
  selecting a successor node, where the local signal intensity of the successor node equals the successor node value;
  determining a successor node value for the successor node; and
  repeating acts of determining the successor node value for the closest node and selecting a successor node until n nodes have been selected, the $n^{th}$ node being a predetermined number of nodes closest to the external disturbance.

9. A method as set forth in claim 1, wherein the act of localizing the external disturbance further comprises an act of activating a predetermined number of sensor nodes to an active state, such that the predetermined number of nodes are the n nodes closest to the external disturbance as determined by their respective local signal strengths.

10. A method as set forth in claim 1, wherein the act of localizing the external disturbance further comprises an act of activating a predetermined number of sensor nodes to an active state, where only those nodes that are within a predetermined hop-count from the node closest to the disturbance are activated.

11. A method as set forth in claim 1, further comprising acts of:
  receiving a second signal at least one detecting node, the second signal originating from a second external disturbance and having a second local signal such that the second local signal reflects a relative proximity of the detecting node to the second external disturbance;
  exchanging information regarding the second signal between the detecting node and nearby nodes; and
  localizing the second external disturbance based on its relative proximity, whereby by receiving a second signal that reflects a relative proximity to the second external disturbance and exchanging that information between nearby nodes, the sensor array localizes the second external disturbance thereby allowing for triangulation of multiple disturbances.

12. A computer program product for event localization within a distributed sensor array using a plurality of sensor nodes, the computer program product comprising computer-readable instruction means encoded on a computer-readable medium for causing a computer to:
  receive a signal in at least one detecting node, the signal originating from an external disturbance and having a local signal at the detecting node such that the local signal reflects the proximity of the detecting node to the external disturbance;
  exchange information regarding the signal between the detecting node and nearby nodes; and
  localize the external disturbance based on its relative proximity to the detecting node, whereby through receiving a signal that reflects a relative proximity of the detecting node to the external disturbance and exchanging that information between nearby nodes, the sensor array localizes the external disturbance.

13. A computer program product as set forth in claim 12, further comprising instruction means for receiving and measuring the local signal as having a local signal intensity that corresponds to each particular node, such that a local signal having a greater local signal intensity received at a detecting node indicates the node is relatively closer to the external disturbance than a detecting node that receives a local signal that receives a lesser local signal intensity.

14. A computer program product as set forth in claim 13, wherein the instruction means to localize the external disturbance further comprises instruction means for performing an operation of determining a closest node based on the local signal intensity, such that the detecting node with the relatively largest local signal intensity is assigned to have a maximum signal intensity and is designated as the closest node.

15. A computer program product as set forth in claim 13, wherein the instruction means to localize the external disturbance further comprises instruction means for performing operations of:
  determining a successor node value for each node, the successor node value being the local signal intensity of a neighbor node to a selected node that is the next closest to the disturbance after the selected node, with such a neighbor node being designated as the successor node; and
  determining the closest n nodes surrounding the external disturbance, thereby allowing the sensor array to localize the external disturbance by determining the closest node and the closest n nodes surrounding the external disturbance.

16. A computer program product as set forth in claim 13, wherein the instruction means to determine the closest node further comprises instruction means for performing operations of estimating a relative distance from each node to the disturbance as measured in terms of a hop-count at each node, comprising operations of:
  initializing a hop-count variable to zero;
  initializing a maximum signal variable to the local signal intensity;
  comparing the maximum signal value of each node to the maximum signal values of neighboring nodes;
    when the maximum signal value of a neighboring node is greater than the maximum signal value of a selected node;
      setting the maximum signal value of the selected node to the maximum signal value of the neighboring node;
      setting the hop-count of the selected node so that it is incrementally greater than the hop-count value of the neighboring node;
    when the maximum signal value of the neighboring node is less than the maximum signal value of the selected node, then do nothing; and
  repeating the act of comparing until the maximum signal value of the neighboring nodes are equal to or less than the maximum signal value of the selected node.

17. A computer program product as set forth in claim 15, wherein the instructions means to determine a successor node value for each node further comprises instruction means for performing operations of:
  setting a selected node's successor node value at an initial value;
  determining whether a neighboring node has a local signal intensity less than a selected node's local signal intensity;
    when the neighboring node has a local signal intensity less than the selected node's local signal intensity, then setting a unique identifier for the selected node's successor node value such that the identifier identifies the neighboring node;
    otherwise, leaving the successor node value for the selected node unchanged;

determining whether another neighboring node's local signal intensity is less than the selected node's local signal intensity but greater than the selected node's current successor node value;

if another neighboring node's local signal intensity is less than the selected node's local signal intensity but greater than the selected node's current successor node value, then setting a unique identifier for the selected node's successor node value, such that the unique identifier identifies the other neighboring node; and otherwise, leaving the selected node's successor node value unchanged.

18. A computer program product as set forth in claim 17, wherein the unique identifier for a neighboring node is a representation of that node's local signal intensity, such that the instruction means for determining a successor node value for each node comprises instruction means for performing operations of:

setting a selected node's successor node value at an initial value; determining if a neighboring node has a local signal intensity lesser than a selected node's local signal intensity;

if the neighboring node has a local signal intensity lesser than a selected node's local signal intensity, then setting the neighboring node's local signal intensity as the selected node's successor node value;

otherwise, leaving the successor node value for the selected node unchanged as the neighbor node's local signal intensity is not a successor node value for the selected node;

determining whether another neighboring node's local signal intensity is greater in signal intensity than the selected node's successor node value, but lesser in signal intensity than the selected node's local signal intensity;

if another neighboring node's local signal intensity is greater in signal intensity than the selected node's successor node value, but lesser in signal intensity than the selected node's local signal intensity, then setting the another neighboring node's local signal intensity as the selected node's successor node value; and otherwise, leaving the selected node's successor node value unchanged.

19. A computer program product as set forth in claim 15, wherein the instruction means to determine the closest n nodes further comprises instruction means for performing operations of:

determining the successor node value for the closest node;

selecting a successor node, where the local signal intensity of the successor node equals the successor node value;

determining a successor node value for the successor node; and repeating acts of determining the successor node value for the closest node and selecting a successor node until n nodes have been selected, the $n^{th}$ node being a predetermined number of nodes closest to the external disturbance.

20. A computer program product as set forth in claim 12, wherein the instruction means to localize the external disturbance further comprises instruction means for performing operations of activating a predetermined number of sensor nodes to an active state, such that the predetermined number of nodes are the n nodes closest to the external disturbance as determined by their respective local signal strengths.

21. A computer program product as set forth in claim 12, wherein the instruction means to localize the external disturbance further comprises instruction means for performing operations of activating a predetermined number of sensor nodes to an active state, where only those nodes that are within a predetermined hop-count from the node closest to the disturbance are activated.

22. A computer program product as set forth in claim 12, further comprising instruction means for performing operations of:

receiving a second signal at least one detecting node, the second signal originating from a second external disturbance and having a second local signal such that the second local signal reflects a relative proximity of the detecting node to the second external disturbance;

exchanging information regarding the second signal between the detecting node and nearby nodes; and localizing the second external disturbance based on its relative proximity, whereby by receiving a second signal that reflects a relative proximity to the second external disturbance and exchanging that information between nearby nodes, the sensor array localizes the second external disturbance thereby allowing for triangulation of multiple disturbances.

23. A system for event localization within a distributed sensor array using a plurality of sensor nodes, the system comprising a plurality of sensor nodes, configured to perform operations of:

receiving a signal in at least one detecting node, the signal originating from an external disturbance and having a local signal at the detecting node such that the local signal reflects the proximity of the detecting node to the external disturbance;

exchanging information regarding the signal between the detecting node and nearby nodes; and localizing the external disturbance based on its relative proximity to the detecting node, whereby through receiving a signal that reflects a relative proximity of the detecting node to the external disturbance and exchanging that information between nearby nodes, the sensor array localizes the external disturbance.

24. A system as set forth in claim 23, wherein the local signal is received and measured as having a local signal intensity that corresponds to each particular node, such that a local signal having a greater local signal intensity received at a detecting node indicates the node is relatively closer to the external disturbance than a detecting node that receives a local signal that receives a lesser local signal intensity.

25. A system as set forth in claim 24, wherein when localizing the external disturbance, the system is configured to perform an operation of determining a closest node based on the local signal intensity, such that the detecting node with the relatively largest local signal intensity is assigned to have a maximum signal intensity and is designated as the closest node.

26. A system as set forth in claim 24, wherein when localizing the external disturbance, the system is configured to perform operations of:

determining a successor node value for each node, the successor node value being the local signal intensity of a neighbor node to a selected node that is the next closest to the disturbance after the selected node, with such a neighbor node being designated as the successor node; and determining the closest n nodes surrounding the external disturbance, thereby allowing the sensor array to localize the external disturbance by determining the closest node and the closest n nodes surrounding the external disturbance.

27. A system as set forth in claim 24, wherein when determining the closest node, the system is further configured to perform an operation of estimating a relative distance from each node to the disturbance as measured in terms of a hop-count at each node, comprising operations of:
  initializing a hop-count variable to zero;
  initializing a maximum signal variable to the local signal intensity;
  comparing the maximum signal value of each node to the maximum signal values of neighboring nodes;
    when the maximum signal value of a neighboring node is greater than the maximum signal value of a selected node;
      setting the maximum signal value of the selected node to the maximum signal value of the neighboring node;
      setting the hop-count of the selected node so that it is incrementally greater than the hop-count value of the neighboring node;
    when the maximum signal value of the neighboring node is less than the maximum signal value of the selected node, then do nothing; and
  repeating the act of comparing until the maximum signal value of the neighboring nodes are equal to or less than the maximum signal value of the selected node.

28. A system as set forth in claim 26, wherein when determining a successor node value for each node, the system is further configured to perform operations of:
  setting a selected node's successor node value at an initial value;
  determining whether a neighboring node has a local signal intensity less than a selected node's local signal intensity;
    when the neighboring node has a local signal intensity less than the selected node's local signal intensity, then setting a unique identifier for the selected node's successor node value such that the identifier identifies the neighboring node;
    otherwise, leaving the successor node value for the selected node unchanged;
  determining whether another neighboring node's local signal intensity is less than the selected node's local signal intensity but greater than the selected node's current successor node value;
    if another neighboring node's local signal intensity is less than the selected node's local signal intensity but greater than the selected node's current successor node value, then setting a unique identifier for the selected node's successor node value, such that the unique identifier identifies the other neighboring node; and
    otherwise, leaving the selected node's successor node value unchanged.

29. A system as set forth in claim 28, wherein the unique identifier for a neighboring node is a representation of that node's local signal intensity, such that when determining a successor node value for each node, the system is configured to perform the operations of:
  setting a selected node's successor node value at an initial value; determining if a neighboring node has a local signal intensity lesser than a selected node's local signal intensity;
    if the neighboring node has a local signal intensity lesser than a selected node's local signal intensity, then setting the neighboring node's local signal intensity as the selected node's successor node value;
    otherwise, leaving the successor node value for the selected node unchanged as the neighbor node's local signal intensity is not a successor node value for the selected node;
  determining whether another neighboring node's local signal intensity is greater in signal intensity than the selected node's successor node value, but lesser in signal intensity than the selected node's local signal intensity;
    if another neighboring node's local signal intensity is greater in signal intensity than the selected node's successor node value, but lesser in signal intensity than the selected node's local signal intensity, then setting the another neighboring node's local signal intensity as the selected node's successor node value; and
    otherwise, leaving the selected node's successor node value unchanged.

30. A system as set forth in claim 26, wherein the when determining the closest n nodes, the system is configured to perform operations of:
  determining the successor node value for the closest node;
  selecting a successor node, where the local signal intensity of the successor node equals the successor node value;
  determining a successor node value for the successor node; and
  repeating acts of determining the successor node value for the closest node and selecting a successor node until n nodes have been selected, the $n^{th}$ node being a predetermined number of nodes closest to the external disturbance.

31. A system as set forth in claim 23, wherein when localizing the external disturbance, the system is further configured to perform an operation of activating a predetermined number of sensor nodes to an active state, such that the predetermined number of nodes are the n nodes closest to the external disturbance as determined by their respective local signal strengths.

32. A system as set forth in claim 23, wherein when localizing the external disturbance, the system is further configured to perform an operation of activating a predetermined number of sensor nodes to an active state, where only those nodes that are within a predetermined hop-count from the node closest to the disturbance are activated.

33. A system as set forth in claim 23, further configured to perform operations of:
  receiving a second signal at least one detecting node, the second signal originating from a second external disturbance and having a second local signal such that the second local signal reflects a relative proximity of the detecting node to the second external disturbance;
  exchanging information regarding the second signal between the detecting node and nearby nodes; and
  localizing the second external disturbance based on its relative proximity, whereby by receiving a second signal that reflects a relative proximity to the second external disturbance and exchanging that information between nearby nodes, the sensor array localizes the second external disturbance thereby allowing for triangulation of multiple disturbances.

* * * * *